INVENTORS
ANGELO J. CARDILE &
BY JOHN W. COLEMAN

ATTORNEY

United States Patent Office 3,171,956
Patented Mar. 2, 1965

3,171,956
VARIANT TEMPERATURE ENVIRONMENT FOR SPECIMEN STAGE OF SCIENTIFIC INSTRUMENT
John W. Coleman, Philadelphia, Pa., and Angelo J. Cardile, Haddonfield, N.J., assignors to Radio Corporation of America, a corporation of Delaware
Filed Mar. 30, 1962, Ser. No. 183,945
15 Claims. (Cl. 250—49.5)

This invention relates to instruments for the examination of microstructure, and more particularly to electron microscopy.

The invention deals with the establishment of the environment of a specimen under examination and may be useful in any scientific instrument which handles specimens. The invention is especially suitable for use in an improved specimen stage for an electron microscope wherein the temperature in the vicinity of the specimen may vary over a wide range of temperatures.

Recent advances in technology have brought about the need for more data as to the microstructure of physical and biological specimens at temperatures far removed from ambient temperatures. This invention provides means which permit examination of specimens over temperatures which range from ambient temperatures to very low temperatures, say around −200° C.

The electron microscope has long been used for the examination of and for obtaining data as to microstructure. However, the conditions of high vacuum within the electron microscope column and the sensitivity of the microscope to changes in its physical dimensions and to specimen excursions which might be thermally induced have heretofore prevented the successful introduction of means for controlling the temperature environment over the desired temperature range of a specimen undergoing electron microscope examination.

Some of the problems which are encountered in attempting to operate an electron microscope specimen stage at temperatures far reduced from ambient temperatures are the following:

(1) Dimensional changes which produce aberrations in the image formed by the electron optics of the microscope.

(2) Significant thermally induced excursions of the specimen during examination, and particularly during the taking of photomicrographs.

(3) Image deterioration and loss of resolving power because of disposition of magnetic and electric field producing and/or distorting elements in the vicinity of the electron beam.

(4) Deterioration of the vacuum in the microscope column due to the introduction of a refrigerant and a concomitant increased contamination in the column.

(5) Vibration of the specimen due to percolation of a fluid refrigerant.

(6) Miniaturization of the refrigeration equipment so that it may occupy the space allotted in the microscope for its specimen stage.

It is therefore an object of the present invention to provide improved instrumentation for controlling the environment of a specimen under examination, which instrumentation is especially adapted for use in electron microscopes and which overcomes the above-mentioned problems.

It is a further object of the present invention to provide an improved specimen stage for scientific instruments for maintaining a specimen refrigerated at very low temperatures.

It is a still further object of the present invention to provide an improved specimen stage for an electron microscope which permits variation in the temperature of the specimen from the ambient temperatures to temperatures far removed from ambient temperatures.

It is a still further object of the present invention to provide an improved specimen stage for an electron microscope wherein the temperature of a specimen may be altered over a wide range of temperatures and wherein thermal controls are incorporated without interference mechanically or electrically with the operation of the microscope.

It is a still further object of the present invention to provide an improved specimen stage for an electron microscope which is adapted to control the temperature environment of the specimen and which is adaptable for use either as an accessory to an electron microscope or as an integral part thereof.

It is a still further object of the present invention to provide a specimen stage for a scientific instrument, which stage is especially adapted for use in an electron microscope, and which is capable of refrigerating a specimen to very low temperatures of the order of −200° C.

It is a still further object of the present invention to provide a device for refrigerating specimens in an electron microscope, which device may be readily installed and readily operated.

Briefly described, a specimen stage embodying the invention which is especially useful in an electron microscope for refrigerating a specimen to very low temperatures may include a support for receiving a specimen in thermally isolated relationship from the microscope column. A refrigeratory body (for example, a receptacle which may contain a refrigerant, such as liquid nitrogen) is disposed around the specimen support on the microscope column thermally isolated from the column. Two sets of fin-like members are provided, one mounted on the refrigeratory body and the other on the specimen support. The fins are separated from each other and interleaved in heat exchange relationship for exchanging heat by radiation between the refrigerant and the specimen. The foregoing specimen stage structure is adapted to be geometrically configured so as not to affect the electron optics of the microscope. Moreover, since the specimen support part and refrigerant body part of the structure are separate from each other, the specimen support part can be made small so that thermally induced movements thereof are substantially negligible. The thermally isolated mounting of the parts provides for efficient cooling and regulation of the temperature.

The invention itself, both as to its organization and method of operation, as well as additional objects and advantages thereof, will become more readily apparent from a reading of the following description in connection with the accompanying drawings, in which:

FIG. 5 is a somewhat enlarged, fragmentary, sectional view taken along the line 5—5 of FIG. 4 and viewed in the direction of the appended arrows, showing portions of the mechanism of FIG. 4;

FIG. 6 is a sectional view of a specimen holder which also functions as a temperature measuring device;

FIG. 7 is a sectional view taken along the line 7—7 of FIG. 6 and viewed in the direction of the appended arrows; and FIG. 8 is a schematic diagram of the electrical system associated with the temperature measuring device of FIG. 6.

General

Figure 1:
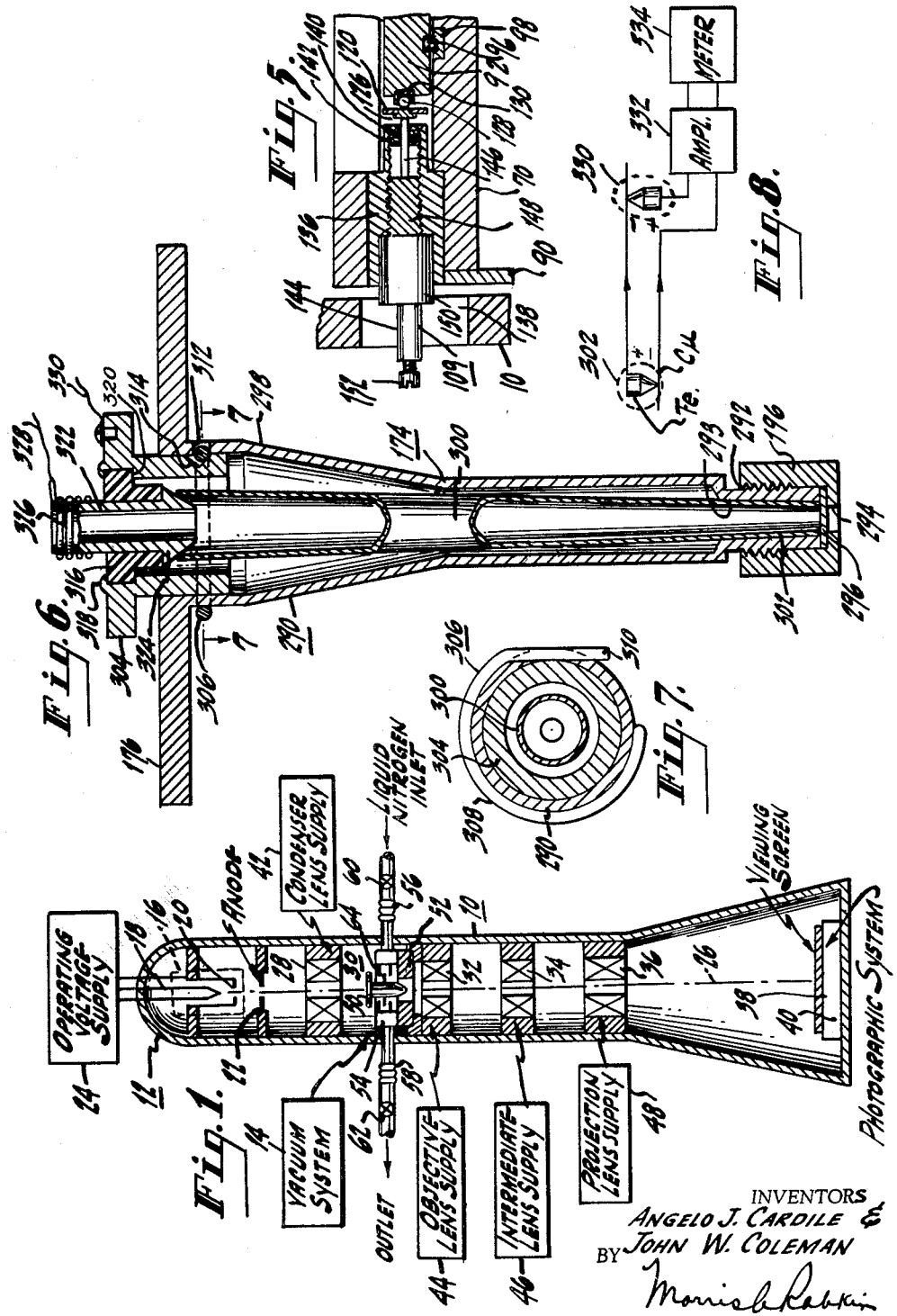
FIG. 1 is a view, partly in longitudinal section and partly diagrammatic, schematically showing an electron microscope incorporating a specimen stage.

Referring more particularly to FIG. 1, there is shown an evacuable housing 10 of an electron microscope 12. The housing may be evacuated by a vacuum pumping system 14. The microscope 12 includes a source of illumination 16 provided by an incandescent filament 18, a cathode 20 and an anode 22. The filament 18 is energized and a difference of potential which may, for example, be one hundred kilovolts between the cathode 20 and the anode 22 is provided by an operating voltage supply 24. The source of illumination 16 projects a beam of electrons, shown by the dash line 26, through a condenser lens 28, a specimen stage 30, an objective lens 32, an intermediate lens 34 and a projection lens 36 upon a fluorescent viewing screen 38. A photographic system 40 is disposed below the viewing screen 38 for the purpose of taking photomicrographs of an image of the specimen. The viewing screen is shifted out of the way of the photographic system when photomicrographs are to be taken. The lenses 28, 32, 34 and 36 are operated by current from different lens supplies 42, 44, 46 and 48, respectively. These supplies include sources of direct current and electrical control equipment, such as potentiometers, which provide current for energizing the various lenses. The electron microscope 12 so far described is similar to the type EMU-3 electron microscope which is manufactured and sold by Radio Corporation of America, Broadcast and Communications Division, Camden 2, New Jersey, and is described in an instruction book issued in 1957 by Radio Corporation of America, as Instruction Book IB-39031-3 (1960).

The specimen stage 30 includes a specimen holder 50 which is mounted on a movable plate 52 supported on the spool of the objective lens 32. The specimen stage 30 also includes means for refrigerating the specimen contained in the holder 50 to very low temperatures in the range of the temperature of liquid nitrogen (−195.8° C.). The refrigerating means includes a refrigeratory body. By a refrigeratory body is meant an element which is adapted to maintain a temperature well below the ambient temperature. In the illustrated apparatus, the refrigeratory body is provided by a receptacle 54 for containing liquid nitrogen and through which the liquid nitrogen may be circulated from an inlet port 56 to an outlet port 58. The inlet port 56 may be coupled through a valve 60 to a source of liquid nitrogen, which may be, for example, a tank of liquid nitrogen contained in a Dewar flask or similar insulating container. The liquid nitrogen may also be introduced into the receptacle by pouring it into the inlet port 56. The outlet port may be coupled through a valve 62 to another container for receiving the liquid nitrogen. The valve 62 may be left open to air for nitrogen to escape as it boils away in the receptacle 54. By selectively controlling the valves 60 and 62, the liquid nitrogen may be introduced into, exhausted from, or circulated through the receptacle 54. Alternatively, the valves 60 and 62 may be left open. Liquid nitrogen may be introduced by pouring a steady trickle thereof to maintain a certain level in the receptacle 54.

A heat exchanger 64 is provided in the form of a first set of fins extending in one direction from the specimen holder 50 and a second set of fins extending in the opposite direction from the receptacle 54, these two sets of fins being interleaved with each other in heat exchange relationship. This heat exchanger 64 provides thermal coupling between the specimen and the refrigeratory body such that the specimen is cooled almost to liquid nitrogen temperature. The heat exchanger 64 is shown with the fins spaced from each other so as to provide for radiative heat exchange between the refrigerant receptacle 54 and the specimen holder 50. However, as will be explained hereinafter, the receptacle and its associated fins may be moved relative to the specimen holder so that there will be conductive, metal-to-metal, thermal coupling between the specimen holder and the receptacle. When the specimen and the holder are coupled in conductive heat exchange relationship, the specimen may be cooled much more rapidly than when the heat exchanger provides coupling by radiation alone.

Alternatively, the specimen holder and the refrigeratory body may be coupled in conductive heat exchange relationship by introducing a dry gas of high conductivity, such as hydrogen or helium, into the specimen chamber. The gas then conducts the heat between the interleaved fins of the heat exchanger and causes the specimen to cool very rapidly. It will be noted that the area of conduction between the fins is very large, while the path therebetween is short. Accordingly, even though the amount of heavy gas in the stage is small, rapid cooling (for example, cooling to about liquid nitrogen temperature in about 15 minutes) may be accomplished through the use of the heavier gas.

Several advantages flow from the use of an arrangement of refrigerant receptacle specimen mounting and fin-type heat exchanger such as described above. These advantages will be brought out more fully hereinafter. A few of these advantages are briefly mentioned at this point as follows:

(1) Since the mechanisms for orienting the specimen holder are mechanically independent of the refrigeration apparatus, separation of the mechanical and thermal functions of the specimen stage is provided.

(2) The specimen holder 50 may be isolated from thermal conduction with any part of the microscope casing or column. This eliminates any unwanted heat sinks or losses and affords highly efficient radiative heat transfer. The specimen holder and heat exchanger may be fabricated as a unit and placed on the movable plate 52 when examination of the micro-structure of refrigerated specimens is desired. Thus, the refrigerated stage may be used as an accessory whenever desired by the microscope user.

(3) The cold refrigerant receptacle acts as a cold trap which makes the vacuum more perfect by trapping free molecules within the microscope column.

Objective lens section

Figure 2:
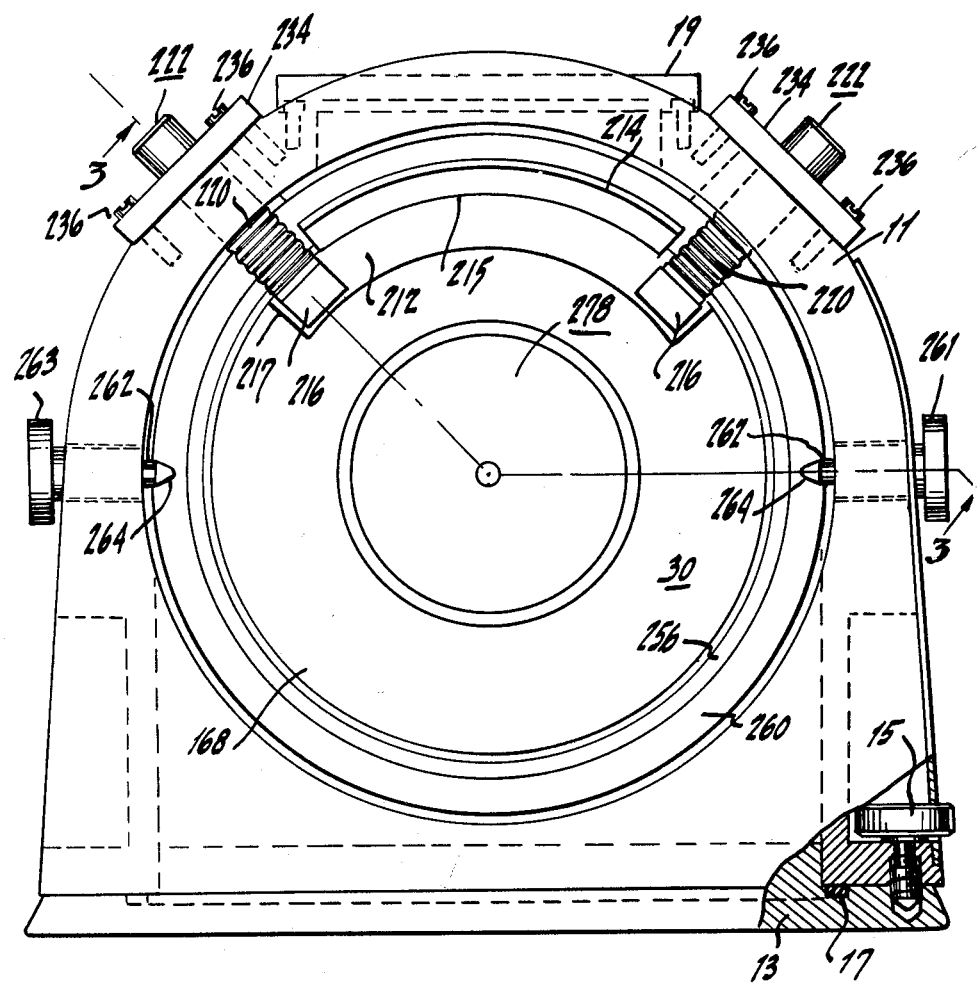
FIG. 2 is an enlarged plan view, partly in section, of the specimen stage of FIG. 1.
Figure 3:
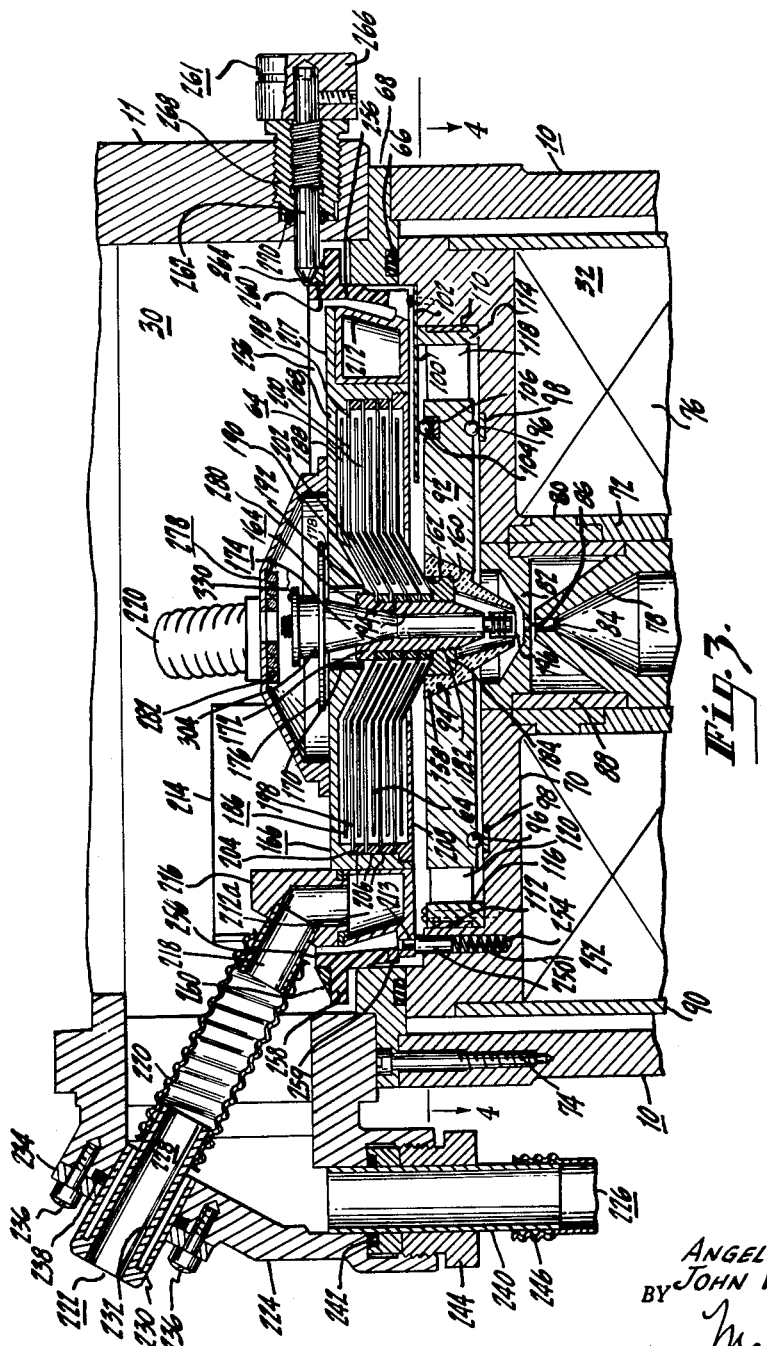
FIG. 3 is a sectional view taken along the line 3—3 of FIG. 2 and viewed in the direction of the appended arrows.

Referring, now, to FIGS. 2 and 3, there is shown a portion of the evacuable housing 10 for the microscope column. The column itself is cylindrical in shape and is made up of the lens sections and other parts. Vacuum seals or gaskets are interposed between juxtaposed sections and parts in a manner known in the microscope art. One of these seals, an O-ring 66, is shown in FIG. 3. This O-ring 66 is disposed between a ring 68 of magnetic material (iron, for example) and the upper flange 70 of the spool 72 of the objective lens 32. The ring 68 is secured to its immediately subjacent column member by means of a plurality of screws 74, one of which is shown in FIG. 3.

The coil 76 of the objective lens 32 is wound around the spool 72 between the flange 70 and another flange (not shown). One of the objective lens pole pieces 78 is mounted within the spool 72. A ring 80 of non-magnetic material, such as brass, forms part of the hub of the spool 72. Another, upper pole piece 82 of the objective lens is mounted adjacent the upper flange 70 of the spool. The pole pieces 78 and 82 have apertures 84 and 86, respectively. The pole pieces 78 and 82 are spaced from each other by a cylindrical tube 88 of non-magnetic material, such as brass, which, with the ring 80, causes the magnetic flux to pass between the pole pieces. A sleeve 90 of magnetic material, such as iron, encompasses the spool 72. This sleeve helps to shield the objective lens from stray magnetic flux and completes the magnetic circuit of the lens for efficient lens operation.

*Specimen stage*

The part 11 of the housing 10 which contains the specimen stage 30 is bell shape in plan, as shown in FIG. 2. The front of the housing part 11 is sealed by a door 13 which is removably held in place by thumb screws 15, one of which is shown in FIG. 2. A vacuum seal in the form of an O-ring 17 is disposed in a slot on the inner face of the door 13.

Another door 19 is located in the rear of the specimen stage housing part 11, which may be vacuum sealed in a manner similar to that of the door 13. This rear door 19 provides access to the specimen stage for cleaning a curved baffle plate 214, which functions as a cold trap type of vacuum pump, as will be more fully explained hereinafter.

The upper flange 70 of the objective lens spool 72 (FIG. 3) provides a base or floor on which the specimen stage 30 of the microscope is mounted. Access to the specimen stage is through the door 13 (FIG. 2). When the door is closed, the column may be evacuated by the vacuum pumping system 14 (FIG. 1).

*Specimen stage orienting mechanism*

The specimen stage 30 (FIG. 3) includes a plate or disc 92, preferably of a low expansion nickel steel, such as Invar. The disc 92 has a conically, downwardly, inwardly tapering opening 94 through the center thereof. This opening provides a socket in which the mounting for the specimen is removably received. Interior sectors of the disc 92 may be cut away, leaving the disc 92 in the form of a lightweight spider.

The disc 92 is movably mounted on three ball bearings 96. These bearings may be spaced circumferentially at convenient angles with respect to the axis of the disc 92. Two of these bearings 96 are shown in FIG. 3. The ball bearings 96 are held in recesses in the bottom of the disc 92 and ride upon inserts 98 of hardened steel in the upper flange 70 of the spool 72. The disc 92 is held down in position by three flat, wide hold-down springs 100, one of which is shown in FIG. 3. These hold-down springs are anchored in cantilever fashion by screws on a shoulder 102 on the upper flange 70 of the objective lens spool 72. The three springs 100 are spaced equidistantly from each other circumferentially around the disc 92, each one being anchored to the shoulder 102 in the manner described above. The springs 100 bear down on ball bearings 104 which are disposed in recesses in the top surface of the disc 92 and ride on hardened inserts 106 in the disc 92 (FIG. 3). The disposition of the bearings 104 is shown in FIG. 4.

Figure 4:
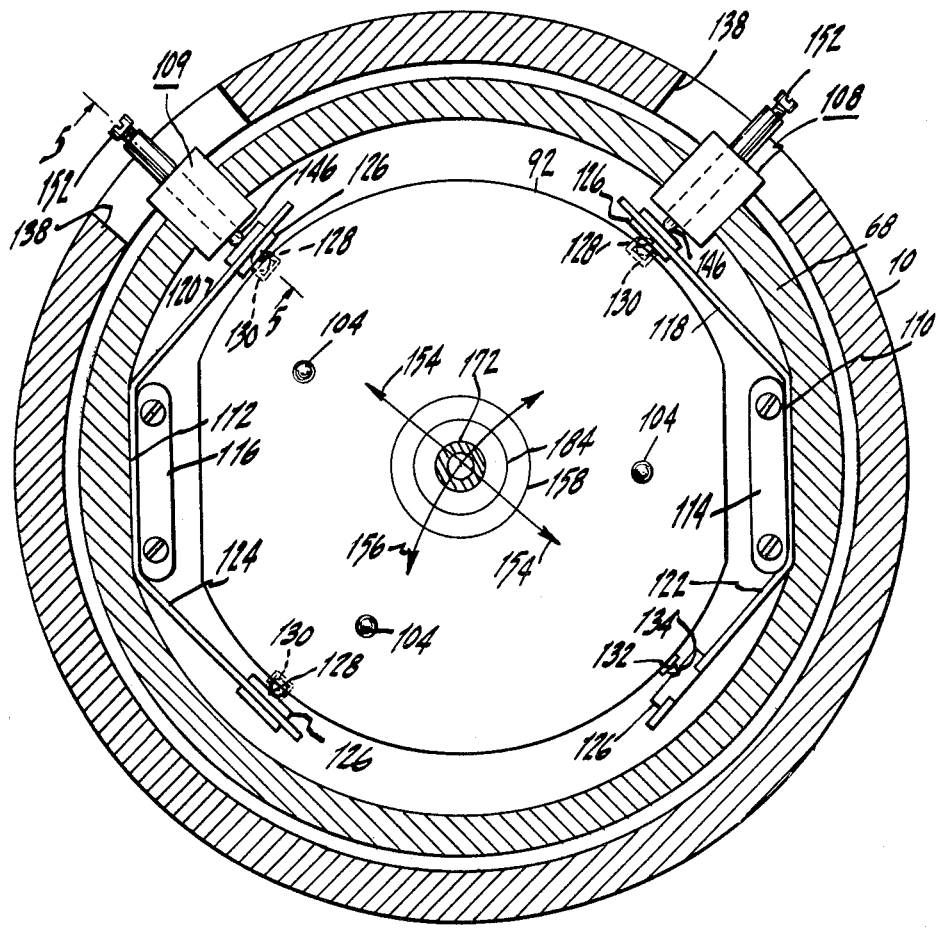
FIG. 4 is a sectional view taken along the line 4—4 of FIG. 3 and viewed in the direction of the appended arrows, showing particularly the mechanism for orienting the stage shown in FIG. 2.

The mechanism for orienting the plate or disc 92 is shown in FIGS. 3, 4 and 5. This mechanism includes a pair of screw-feed drives 108 and 109 (FIG. 4) and two backlash eliminating, leaf-type springs 110 and 112 which cooperate, respectively, with the drive mechanisms 108 and 109. The leaf springs 110 and 112 are held in position by means of clamping blocks 114 and 116, respectively. The clamping blocks 114 and 116 are screwed into the upper flange 70 of the objective lens spool 72. Opposed arms 118 and 120 of the leaf springs 110 and 112, respectively, are biased outwardly against their associated drive mechanisms 108 and 109. The other opposed arms 122 and 124 of the leaf springs 110 and 112, respectively, are biased inwardly toward the disc 92. Inserts 126 of hard material, such as sapphire, are inserted into openings in the arms 118, 120, 122 and 124 of the leaf springs 110 and 112 where these leaf springs contact the drive mechanisms 108 and 109 and/or the disc 92.

The contact between the arm 118 of the spring 110 and both arms 120 and 124 of the spring 112 and the disc 92 are similar and are shown in FIGS. 4 and 5. These contacts include balls 128 held in cup-like retainers 130 which are inserted into blind holes in the rim of the disc 92 (see FIG. 5). The balls 128 bear upon the sapphire inserts 126.

The contact between the disc 92 and the arm 122 is made by means of a wedge 132 which fits into a V-shaped notch 134 in the insert 126 on the arm 122. Only the insert 126 of the arm 122 has such a notch. This wedge 132 provides a pivot for the disc 92 about which it may be rotated by the drive mechanism 108. All of the contacts, that is, the balls 128 and the wedge 132, are in the same plane.

One of the drive mechanisms is best shown in FIG. 5. Both mechanisms 108 and 109 are substantially identical. They include cylindrical sleeves 136 which pass through openings in the upper flange 70 of the lens spool. These lens spool openings are aligned with openings 138 in the housing 10. A portion of the sleeve 136 is internally threaded. The inner end of the sleeve is closed except for a center hole.

A shaft 144 extends radially through the opening 138 in the housing 10 and through the sleeve 136. A push rod 146 on the inner end of the shaft 144 extends through the opening in the inner, closed end of the sleeve 136 and bears against the sapphire insert 126 on the arm 120 of the leaf supring 112. An O-ring 140 around the rod 146 is held in place by a packing gland nut 142, and provides a vacuum seal. The push rod adjoins an externally threaded shaft portion 148 which screws into the sleeve 136. A boss 150 forms part of the shaft 144 beyond the threaded part 148 thereof. The free end of the shaft extends through the opening 138 in the column 10. Gearing for accurately turning the shaft 144 for minute movements may be fastened to the free end of the shaft 144 by means of a screw 152.

Since the arms 120 and 118 of the leaf springs 112 and 110, respectively, are biased against the plungers 146 of their related shafts 144, any backlash in the screw threads of the threaded portion 148 thereof is prevented by the arms 118 and 120. The force for biasing the disc toward the push rods 146 of the drive mechanisms 108 and 109 is provided by the arms 122 and 124 of the respective springs 110 and 112. The arms 122 and 124 also provide biasing forces which add to the biasing forces of the arms 118 and 120 to further prevent backlash in the screw threads of the drive mechanisms 108 and 109.

When the shaft 144 of the mechanism 109 is turned, the disc 92 executes a rectilinear motion in directions shown by the straight line arrows 154 (FIG. 4). When the shaft of the other drive mechanism 108 is turned, the disc 92 pivots about the wedge 132 and executes arcuate motion in directions shown by the other, curved line arrows 156. Only rectilinear motion is possible in response to the drive mechanism 109, since the axis of its push rod 146 is perpendicular to a diameter of the disc 92 drawn between the balls 128 on the arms 124 and 118. These spring arms 118 and 124 therefore prevent any rotational movement of the disc 92. On the other hand, the pivot point provided by the wedge 132 permits rotational movement of the disc 92. Thus, by adjusting the position of the shafts 144 of both the drive mechanisms 108 and 109, different, desired orientations of the disc 92 and, consequently, of the specimen mounted therein may be obtained.

The axes of the shafts 144 of both drive mechanisms 108 and 109 and the points of contact between the disc 92 and the springs 110 and 112 are all in substantially the same plane perpendicular to the electron beam axis. Accordingly, no tilting or other inclination of the disc 92 with respect to the axis of the column 10 and with respect to the electron beam axis occurs when the drive mechanisms 108 and 109 are adjusted. A specimen carried by the disc 92 therefore is always maintained in the same transverse plane with respect to the electron beam axis of the column. Thus, false stereoscopic images of the specimen will not result.

Specimen refrigerating stage in general

An adaptor 158 (see FIG. 3) is received within the conically tapered opening 94 in the disc 92. This adaptor 158 is made of a suitable insulating material, such as alumina ceramic. The adaptor 158 is generally of hollow conical shape. Part of its outer periphery has a taper which is conjugate to the taper of the opening 94 in the disc 92. The lower end of the adaptor extends well within the upper pole piece 82 so as to provide a thermal shield which surrounds the specimen holder, as will be more apparent as the description proceeds. The inner periphery of the adaptor 158 is formed with a shoulder 160 adjoining a generally cylindrical internal wall 162. The shoulder 160 is precisely located with respect to the tapered, outer periphery of the adaptor. The shoulder 160 provides a reference position for the specimen mounting, the use of which is explained hereinafter.

The adaptor 158 is desirably metallized on all of its external surfaces except the shoulder 160 and the internal cylindrical wall 162. A metal such as silver may be evaporated on the desired surfaces of the adaptor. This provides a metallic coating which carries away any charges which might otherwise be accumulated on the surfaces of insulating material forming the adaptor 158.

The refrigeration equipment of the specimen stage may be considered in two parts. One of these parts 164 provides for mounting the specimen in precise location on the adaptor 158, and is referred to herein as the specimen mounting part. The other of these parts 166 is associated with the refrigerant which absorbs the heat from the specimen and cools the specimen to the desired, low temperature, and is referred to herein as the refrigerant part 166. A removable drum-like case 168 carries or contains these parts 164 and 166 of the refrigerated specimen stage. The disposition of the case 168 within the stage 30 is discussed in greater detail hereinafter. Many of the refrigerated stage parts may be removed merely by withdrawing the case 168 from the column through the door 13 (FIG. 2) therein. After the case 168 is removed, the adaptor ring 158 (FIG. 3) may also be removed. The adaptor ring may, however, be secured to the specimen mounting part 164 and form a unitary structure therewith, whereby the adaptor is removed with the case 168. The disc 92 may then receive a conventional specimen holder in its opening 94.

Specimen stage specimen mounting part

The specimen mounting part 164 includes a collar 172 which is a generally cylindrical tube having an internal wall of cylindrical form at its lower end and conical form at its upper end. A specimen holder 174 is received within the collar 172. The specimen holder has an outer wall conjugate to the internal wall of the collar 172 so as to fit into the collar 172. The specimen holder 174 also has a flange 176.

The upper end of the collar 172 is of greater diameter that the lower end thereof. The lower part of the collar is tapered inwardly from an externally threaded portion 182. The threads are intended to receive a threaded ring 184 through which the lower part of the collar 172 passes. This ring 184 serves to position the specimen mounting on the shoulder 160 of the adaptor 158. The ring 184 has a cylindrical outer periphery and a dished, conical, upper surface.

The heat exchanger 64 (FIG. 1) includes, in part, a plurality of disc-like heat exchanger fins 186 secured to the collar 172 with the ring 184. Each fin includes an outer, circular, flange portion 188, a conical center portion 190, and a short, circular, inner flange 192 which extends from the conical center portion. The fins 186 are assembled in stacked relationship on the collar 172 by means of spacer rings 194 which, with the internal flanges 192, are clamped together between the bottom of the larger diameter, upper end of the collar 172 and the dished surface of the threaded ring 184. Each fin 186 is thick enough to be rigid and self-supporting. Therefore, the fins 186 can be mounted (as shown) along their inner flanges as cantilevers. The fins are made of conductive material. Chemically blackened brass is preferred. The fins are dimensioned with their thickness related to their radius so that good heat exchange is obtained therefrom.

Summarizing, the specimen mounting part 164 includes the collar 172 on which the fins 186 are mounted by means of the ring 184. The ring 184 is received within the cylindrical, internal wall 162 of the adaptor 158 and is precisely located by means of the shoulder 160 on the adaptor 158. The specimen holder 174 is received in precise positional relationship in the opening through the collar 172 since its conical, external wall snugly embraces the internal wall of the collar 172 in exact position therein, the elevation of the holder being set by the external taper on the specimen holder 174 and the internal taper on the upper part of the internal wall of the collar 172.

The specimen is secured in the specimen holder 174 at the lower end thereof, immediately above the upper pole piece 86, by means of a cap 196 which is threaded on the lower end of the holder 174. The specimen holder 174 will be described in greated detail in connection with FIG. 6 of the drawings.

Specimen stage refrigerant part

The refrigerant part 166 includes the means for introducing and storing the liquid refrigerant in the specimen stage 30. Storage for the liquid refrigerant is provided by a hollow reservoir or receptacle 212 which forms a toroidal channel 212a. The receptacle 212 has a conically tapered, outer, peripheral wall and a cylindrical, inner, peripheral wall. A flange 213 extends outwardly from the lower edge of the outer, peripheral wall. Sectors are cut out of this flange to provide clearance for other parts.

A pair of ears 216 (only one appears in FIG. 3, both being shown in FIG. 2) are secured to the upper wall of the receptacle 212 as by brazing, for example. These ears 216 have holes therethrough which provide entry into the liquid refrigerant channel of the receptacle 212. Pipe nipples 218 (FIG. 3) are inserted into the ears 216 and fastened thereto by brazing. Flexible pipes 220, which may be made of corrugated, stainless steel, are brazed to the nipples 218. These pipes 220 are connected to hereinafter described entry ports 222 for the liquid refrigerant.

The previously mentioned curved baffle plate 214 (FIGS. 2 and 3) of conductive material, such as brass, is secured, as by brazing, on a shelf 215 which extends outwardly from the upper wall of the receptacle 212.

As mentioned above, a suitable liquid refrigerant is liquid nitrogen. The liquid nitrogen chills the receptacle 212 and also the baffle plate 214. The peripheral surfaces of the receptacle 212 and the baffle plate 214 are thus maintained very cold (for example, about $-190°$ C.). These surfaces therefore act as a cold trap on which any gases or vapors present in the column may condense. When such gases or vapors condense, the pressure in the column is lowered and the vacuum is made more perfect. The greatest degree of condensing occurs at the cold baffle plate 214, since it is adjacent to a vacuum port 226 into which the vapors are drawn. Accordingly, vacuum pumping action is obtained through the use of the refrigeration apparatus. The condensed vapors may be readily removed from the surfaces of the baffle 214 and of the receptacle 212 by wiping the surfaces thereof. Access to the baffle 214 and the receptacle 212 may be had through the rear door 19 in the housing part 11 (FIG. 2).

Two ports 222 are provided in the housing 10. The liquid nitrogen may be passed through these ports 222, the pipes 220, and ears 216 into the receptacle 212 without disturbing the vacuum and without appreciable loss of liquid nitrogen by absorption of heat after initial cooling. One of the ports 222 for the liquid nitrogen may share the same bracket 224 as the vacuum port 226, or a separate vacuum port on the back of the housing 10 may be provided. The vacuum port 226 is connected to the vacuum system 14 (FIG. 1) for the purpose of evacuating the column.

Each of the ports 222 for the liquid nitrogen includes a pipe 228 which has an outer wall 230 and an inner wall 232. The walls 230 and 232 are interconnected at one end thereof but are spaced from each other elsewhere. This "folded-over" pipe 228 arrangement provides a long, thermal conduction path between the inner wall 232 of the pipe, which contacts the liquid nitrogen, and the outer wall 230 thereof which is connected to the housing 10. The thermal drop between the inner and outer pipe portions 232 and 230, respectively, is sufficient so that the column 10 does not serve as a major heat sink. Accordingly, the housing 10 does not contribute a significant amount of heat to the entering liquid nitrogen.

A clamping ring 234 which is secured to the bracket 224 by means of screws 236 encloses a gasket vacuum seal in the form of an O-ring 238. This ring 238 provides a vacuum tight connection between the column 10 and the pipe 228.

The vacuum port 226 includes a pipe 240 which is secured between the bracket 224 and the housing 10 in vacuum tight relationship by means of another O-ring 242. The pipe 240 is in engagement with a locking nut 244 which holds the pipe in place. A flexible hose 246 connects the pipe 240 to the vacuum system.

Both liquid nitrogen admitting pipes 220 are connected by means of ports similar to the port 222 to the exterior of the housing 10. Liquid nitrogen may be pumped into the reservoir 212 through either or both of the pipes 220 by connecting a hose from tanks of liquid nitrogen to the pipe 228. Alternatively, the liquid nitrogen may be poured into one of the pipes 228. The nitrogen vapors can be allowed to escape through the other pipe.

Under some circumstances, it may be desirable to flow the liquid nitrogen into one of the ports 222, through the reservoir 212, and out of the other of the ports 222. On the other hand, it may be desirable to use one of the ports 222 as a vent for vapors from the liquid nitrogen and to allow liquid nitrogen to enter through only one of the ports 222 to replace any nitrogen in the reservoir 212 which has evaporated.

The receptacle 212 is mounted on the upper flange 70 of the lens spool 72 (FIG. 3). The receptacle mounting is provided by at least three cylindrical pins 250 of insulating material, such as nylon. Only one of the pins 250 is shown in FIG. 3. The pins 250 have reduced diameter ends which extend into openings in the flange 213 on the receptacle 212. The pins 250 are disposed in blind holes 252 in the upper flange 70 of the objective lens spool 72. The pins are spring biased upwardly by compression springs 254. Since the pins 250 are of insulating material, the receptacle 212 is out of thermal contact with the microscope housing 10 and the column and does not gain heat rapidly from the housing 10 or from the column. The spring biased pins 250 also allow some vertical movement of the entire refrigerant part 166 of the stage 30.

In order to provide for vertical translation of the part 166, there is provided a cylindrical ring 256 (FIGS. 2 and 3) of insulating material, such as nylon. The lower edge of the ring 256 has three tab-like, downward projections 259 which engage the flange 213. The use of three points of contact between the receptacle and the ring 256 further reduces thermal losses. A cylindrical flange 258 extends radially beyond the outer periphery of the ring 256. A metal ring 260 of triangular cross-section is inserted between the outer wall of the ring 256 and its flange 258 so as to provide a beveled edge on the ring 256 assembly.

The ring 256, and consequently the entire refrigerant part 166 of the refrigeration apparatus in the stage 30, can be moved vertically by means of two plunger mechanisms 261 and 263. These mechanisms include two rods 262 diametrically opposite each other. Each rod 262 has a tapered nose 264 which engages the beveled edge of the ring 260. The rear end of each rod 262 has a screw thread which is rotatable within a collar 268 by means of a knob 266 external to the housing 10. The collar is screwed into a threaded hole in the housing 10 and confines a vacuum seal by means of an O-ring 270 between the column, the rod 262 and the collar 268 to thereby prevent the loss of vacuum from the column through the threading in which rods 262 are rotated or inserted.

The case 168 is removably mounted on and within the inner periphery of the receptacle 212. A flange 217 extends from the upper wall of the case 168 and rests on the upper wall of the receptacle 212. This flange 217 has sections cut away to provide clearance for the ears 216.

The heat exchanger 64 is contained within the case 168 and the specimen holder 174 extends through a hole 170 in the center of the upper wall of the case. The heat exchanger 64 includes a plurality of fins 198, which are mounted on the internal cylindrical side wall of the case 168. The fins 198, like the fins 186, are funnel-like in shape and each includes a circular flange 200 from which a frusto-conical part 202 extends in an inward and downward direction. The fins 198 are preferably made of sheets of chemically blackened brass and have thickness and radial extent related for optimum heat exchange effect according to known fin design practice. The fins are sufficiently thick to be rigid and self-supporting when mounted along their rims as cantilevers. The fins 198 are assembled in stacked relationship between a circular, flat shoulder 204 which extends horizontally from the inside of the side wall of the case 168 and a disc 208. The fins 198 are separated from each other by means of spacer rings 206 which engage the outer marginal portions of the flanges 200. The circular disc 208 is screwed into the bottom of the side wall of the case 168 and forms the lower end wall thereof. This disc 208 clamps the fins 198 and the spacer rings 206 between the shoulder 204 and the upper surface of the disc 208 which also acts as a radiation shield. The assembly of the fins 198 on the case 168 and the fins 186 on the collar 172 is accomplished conjointly so that the fins 198 are interleaved with the fins 186.

A heater 278 is mounted on the upper end wall of the case 168 for the purpose of allowing the establishment of temperatures between the ambient and liquid introgen temperatures in the vicinity of the specimen. This heater 278 is mounted in a removable cap 280 which is centrally apertured for the passage of the electron beam. The removable cap rests in thermal contact with the case 168 and therefore with the reservoir 212. Accordingly, some heat may be given by the heater 278 to the receptacle 212 and to the case 168 so as to cause the temperature of the fins 198 to be held stable at intermediate temperatures within the range from liquid nitrogen temperature to the ambient temperature. Heating is accomplished by a noninductive wafer type heater 282 of known design which is parallel to the disc 92 and therefore with the flange portions 200 and 188 of the fins 198 and 186, respectively. Since the heater 282 is non-inductive, it does not interfere with the electron beam or the electron optics of the system.

The refrigerant part 166 of the stage 30 and the specimen mounting part 164 thereof are mechanically independent of each other because they have independent means of support which position these stage parts 164 and 166 so as to be separate from each other. This mechanical independence results from the dimensions, position and shapes of the parts themselves and their mountings. The specimen mounting part 164 position is referenced by the shoulder 160 of the adaptor 158. The refrigerant part 166 is positioned by the insulating pins 250. The insulating pins and the shoulder 160 are so related in relative height that the specimen mounting part 164 floats free of the refrigerant part 166. The parts may, however, be brought in contact with each other if desired by vertically moving the refrigerant part by means of the two rods 262.

The specimen holder 174 also floats free of the refrigerant part 166. When the holder 174 is received within the collar 172, it is positioned with its flange 176 separated from the upper end wall of the case 168 by a small clearance 178. This clearance results from the fit of the conical section of the holder 174 and the conical section of the interior wall of the collar 172 which sets the position of the flange with respect to the reference shouldler 160 of the adaptor 158.

In summary, the construction of the refrigerant part 166 of the apparatus includes the case 168 on which the heat exchanger fins 198 are mounted in cantilever fashion interleaved in concentric relationship with the fins 186 of the specimen part 164. The receptacle 212 receives a liquid refrigerant, such as liquid nitrogen, and provides a seat for the case 168. The case 168 and its associated parts are also mounted in heat insulating relationship with the objective lens spool 72 and may be moved in a vertical direction by means of the insulating ring 256 and the knob controlled plungers 262. A heater 282 in heat exchange relationship with the receptacle 212 through the case 168 makes the temperature in the stage controllable from ambient to liquid nitrogen temperatures.

*Specimen stage operation*

Two modes of cooling are provided for in the specimen stage 30. These are cooling by radiation and cooling by conduction. Cooling by conduction is especially desirable when the specimen is to be refrigerated rapidly. The refrigerated condition is then desirably maintained by continuing the cooling by radiation.

In order to cool by conduction, the knobs 266 are turned to withdraw the rods 262 outwardly and away from the ring 256. The case 168 then rises under the bias from the springs 254 until the upper end wall of the case 168 contacts the flange 176 of the specimen holder 174. A direct thermal conduction path is therefore obtained between the specimen held by the cap 196 at the lower end of the holder 174 and the receptacle 212.

When cooling by radiation is desired, the rods 262 are advanced inwardly to cause the ring 256 to move downwardly. The entire receptacle 212 and case 168 then move downwardly with the spring biased plugs 250 until the clearance 178 is again established between the flange 176 on the specimen holder 174 and the upper end wall of the case 168. The case 168 and the fins 198 of the refrigerant part 166 also float free of the fins 186 of the specimen mounting part 164. Cooling then proceeds by radiation between the fins. The heat exchange between the fins, even by radiation, is efficient because of the thermo-mechanical relationships of the interleaved fins 198 and 186. When the cooling is by radiation, the specimen mounting part 164 is completely free of the refrigerating part 166. Thus, any movements of the refrigerating part 166, such as would be caused by percolation of the liquid nitrogen in the receptacle 212, are not transferred to the specimen holder. Accordingly, unwanted excursions, vibrations or other movements of the specimen due to movements of the refrigerant part 166 are prevented.

Thermally induced movements of the specimen are also small because of the bi-part construction of the stage 30. The parts of the stage 30 may be made smaller than in the case where a large, integral structure would be used. Movements of such small parts due to thermal expansion and contraction are reduced correspondingly with their small size and have been found to have a negligible effect on the operation of the stage and the use thereof in electron microscopy.

The heavier part of the refrigeration apparatus is the refrigerant part 166. The refrigerant part 166 is not mechanically coupled to the movable disc 92. Only the specimen mounting part 164 moves with the disc 92. This feature of construction reduces the mechanical loading on the drive mechanisms for the disc 92 and makes orientation of the disc 92 much more readily and easily accomplished.

The concentric, coaxial relationship of the fins in the heat exchanger 64, the refrigerant receptacle 212 and most of the other parts associated with the refrigeration apparatus also alleviates adverse affects on the electron optics of the system. The electrical and magnetic fields established in the vicinity of the electron beam which might bend or tilt the beam have a negligible effect because of the concentric, coaxial relationship of the fins and other parts of the apparatus.

*Specimen holder*

The specimen holder 174 is shown in greater detail in FIGS. 6 and 7. The holder is provided by an open-ended, tubular structure 290 which has the flange 176 extending from its upper end. This structure is desirably of copper. The lower reduced end of the tubular structure is formed externally with threads 292. The cap 196 is threaded internally and has an aperture 294 coaxial with the tubular structure 290. The cap 196 is screwed onto the threads 292 and firmly holds a specimen 296 across the bottom of the tubular structure 290. The tubular structure 290 has a conically tapered section 298 which is received within the opening in the collar 172 (FIG. 3). Otherwise, the structure 290 is cylindrical in shape. The lower section of the tubular structure 290 has a cylindrically shaped interior wall. The bottom part 293 of this lower interior wall is reduced in diameter from the remainder thereof so as to engage the lower end of an open-ended, frusto-conical tube 300 therewithin.

A thermocouple junction 302 is formed where the tube 300 and structure 290 engage each other. This junction is cylindrical in shape and contacts the specimen 296. The tube 300 does not touch the tubular structure 290 except at the junction 302. The tube 300 is desirably made of stainless steel. A columbium or titanium stabilized stainless steel having a carbon content of less than 0.02% is preferred, since such a stainless steel is especially suitable for silver brazing. A suitable stainless steel is described in the "Stainless Steel Handbook," published by Allegheny-Ludlum Steel Corp., Pittsburgh, Pa. (1956) as Type 316 (see page 3 of the referenced handbook).

The thermocouple junction may be formed by silver brazing the tube 300 to the copper tubular structure 290.

A flanged, hollow cylinder 304 of copper provides one electrode of the thermocouple. This cylinder is disposed in telescoping relationship with the tubular structure 290 at the top thereof and is held in place by means of a clamping spring 306 (FIG. 7). A circular part 308 of the spring 306 surrounds the outside of the tubular structure 290. A straight part 310 of the spring 306 extends through a slot 312 in the tubular structure 290 into engagement with the flanged, hollow cylinder 304 at a notch 314 therein.

A grommet 316 of insulating material, desirably a ceramic, is mounted inside the hollow cylinder between a lip 318 and an internal, cylindrical shoulder 320 thereof. A hollow, stainless steel cylinder 322 which has a tapered end portion 324 of enlarged diameter extends through the opening in the grommet 316 with the tapered portion securely disposed within the stainless steel tube 300 at the upper end thereof. A stainless steel spring 326 around the outside of the tube 322 serves as a contactor. A stainless steel lead 328 may be connected to the spring 326. A copper wire 330 may be connected to the copper cylinder 304. These wires 328 and 330 provide electrical connections to the junction 302. Vacuum tight feed-through grommets (not shown) are provided in the wall of the housing 10. The leads 328 and 330 are brought out of the housing through these grommets.

The electron beam passes through the hollow cylinder 322, the stainless steel tube 300, the specimen 296 and the aperture 294 in the cap 196. The concentric, coaxial construction of the thermocouple specimen holder is especially suitable for electron optical systems since all parts of the holder are symmetrical with respect to the beam and do not exert any influence on the beam or the electron optics of the microscope. The choice of copper for the outer, tubular structure also provides a high conductive path between the fins 186 on the specimen mounting and the specimen so as to facilitate rapid cooling thereof (see FIG. 3). The symmetrical geometry of the holder also provides for uniform cooling of the specimen 296. The specimen holder 174 may be removed by means of a plier-like tool which engages the flange 176 thereof. The tool may also be used to remove the case 168 including the heat exchanger and specimen mounting part 164.

It has been found that a thermocouple junction such as described above has a substantially linear response characteristic over the temperature range from ambient temperature to liquid nitrogen temperatures in that the output voltage from the thermocouple changes substantially linearly with changes in temperature over the operating range of the refrigeration apparatus. Since the copper and stainless steel parts are spaced from each other except at the junction, there are no hidden junctions or short circuits in the electrical circuit to the junction 302.

An electrical circuit suitable for operating the thermocouple is shown in FIG. 8. The junction 302 in the vicinity of the specimen is connected in series with the junction 330 which may act as a reference junction by being coupled to an ice water bath so as to maintain its temperature at zero degrees centigrade. The reference junction 330 and the thermocouple junction 302 in the holder 174 are connected in series opposing relationship (the junction 302 and the junction 304 are oppositely polarized). The net voltage difference between the output of the reference junction and the junction 302 is applied to an amplifier 332 which may be a D.C. amplifier of the chopper type. The output of this amplifier is a D.C. voltage which may be measured on a sensitive meter 334. Since the thermocouple 302 in the holder 178 has a linear response characteristic, the scale of the meter may have a linearly calibrated temperature scale, which linearity facilitates reading temperatures from the meter.

What is claimed is:

1. Specimen temperature changing apparatus comprising
   (a) a heat exchanger having a plurality of disc-like heat exchanger fins,
   (b) means for producing temperatures different from ambient temperature connected to certain of said plurality of fins, and
   (c) means for mounting a specimen spaced from said temperature producing means and connected to others of said plurality of fins than said certain fins.

2. Apparatus for changing the temperature of a specimen, said apparatus comprising
   (a) a mounting for said specimen,
   (b) a body around said mounting and spaced therefrom,
   (c) means for changing the temperature of said body, and
   (d) interleaved, cooperating heat exchange means associated separately with said body and said mounting for maintaining said body and said mounting in heat exchange relationship with each other.

3. Specimen refrigeration apparatus comprising
   (a) a mounting for a specimen,
   (b) a refrigeratory body physically and thermally separated from said mounting, and
   (c) a heat exchanger including a plurality of spaced, interleaved heat exchange elements, some of said elements being connected to said body and others of said elements being connected to said mounting.

4. Apparatus for use in a scientific instrument for changing the temperature of a specimen adapted to be examined therein, said apparatus comprising
   (a) specimen mounting means,
   (b) means for providing a change in temperature including a body having an alterable temperature,
   (c) heat exchanger means including a plurality of fins extending separately from said body and said mounting means in interleaved relationship with each other, and
   (d) means for separately supporting said mounting means and said body on said instrument with their respective said fins spaced apart from each other in heat exchange relationship.

5. Apparatus for refrigerating a specimen for examination in a scientific instrument having a specimen stage including supporting members therein, said apparatus comprising
   (a) a refrigeratory body,
   (b) a specimen mount,
   (c) heat exchange means including a plurality of fins disposed separately on said mount and on said refrigeratory body and interleaved with each other, and
   (d) means disposed separately between said supporting members, said refrigeratory body and said mount whereby those of said fins on said body float free of others of said fins on said mount when said apparatus is disposed in said instrument with said mount and said body disposed on said supporting members.

6. Apparatus for controlling the temperature of a specimen during observation thereof in a scientific instrument, said apparatus comprising
   (a) means for mounting a specimen in said instrument,
   (b) annular-shaped means for producing therein a temperature change from the ambient temperature to a temperature different from ambient temperature,
   (c) said last-named means being disposed around said mounting means, and
   (d) heat exchange means including a plurality of annular fins mounted separately in interleaved relationship on said mounting means and on said temperature change producing means.

7. Apparatus for use in a scientific instrument for refrigerating a specimen therein, said apparatus comprising
   (a) an annular refrigeratory body,
   (b) an annular member for mounting a specimen disposed within said body and separated therefrom, and
   (c) a plurality of interleaved, annular fins, alternate ones of said fins being secured to said body and the intervening ones of said leaves being secured to said member for exchanging heat therebetween.

8. Apparatus for refrigerating a specimen adapted to be examined in a scientific instrument, said apparatus comprising
   (a) a cylindrical receptacle for receiving a refrigerant,
   (b) a cylindrical specimen mounting member coaxially disposed in said receptacle, and
   (c) two sets of heat exchange members, each comprising a plurality of disc-like heat exchanger fins interleaved with those of the other set, said sets being mounted respectively on said receptacle and on said member, said fins also being coaxial with said receptacle and said mounting member.

9. Apparatus for refrigerating a specimen adapted to be examined in a scientific instrument, said apparatus comprising
   (a) a cylindrical receptacle for receiving a refrigerant,
   (b) a cylindrical member for mounting said specimen, (c) said member being coaxially disposed within said receptacle,
(d) a plurality of disc-like heat exchanger fins mounted interleaved with each other separately on said receptacle and on said member,
(e) said fins also being coaxial with said receptacle and said member, and
(f) an annular heater mounted in coaxial relationship with said receptacle.

10. In an electron microscope having an evacuable column, a specimen stage disposed in said column and comprising
(a) an annular receptacle for containing a refrigerant, said receptacle being disposed coaxially with respect to said column and mounted in thermally insulating relationship therewith,
(b) an annular mount for receiving a specimen disposed coaxially with said column within said refrigerant receptacle and mounted in insulating relationship with said column, and
(c) a plurality of annular heat exchange fins also coaxial with said column and mounted separately in interleaved relationship on said specimen mount and on said refrigerant receptacle.

11. In an electron microscope having an evacuable, cylindrical column, a specimen stage disposed in said column and comprising
(a) an annular receptacle for containing a liquid refrigerant,
(b) means for mounting said receptacle in thermally insulating relationship with said column and coaxially therewith,
(c) an annular mount for receiving a specimen,
(d) means for mounting said mount within said refrigerant receptacle and in insulating relationship with said column and coaxially therewith, and
(e) a plurality of annular heat exchange fins mounted separately in interleaved relationship on said specimen mount and on said refrigerant receptacle, said fins also being coaxially disposed with respect to said column.

12. In an electron microscope having an evacuable housing through which an electron beam passes, and a lens system for focusing said beam including an objective lens having a lens spool with a winding thereon, a specimen stage comprising
(a) a plate mounted on said spool for movement in all directions in a plane normal to said beam and having an opening through which said beam passes,
(b) a hollow cylindrical collar,
(c) insulating means for mounting one end of said collar on said plate coaxially with the axis of said beam,
(d) means for mounting a specimen on said collar transverse to said beam,
(e) a hollow cylindrical member having an annular chamber therein,
(f) means for introducing a liquid refrigerant into said chamber,
(g) insulating means for mounting said chamber on said spool and coaxially with the axis of said beam,
(h) a plurality of fins of disc-like configuration cantilever mounted in vertically spaced relationship with each other on the outer wall of said collar and extending outwardly therefrom, and
(i) a plurality of fins of disc-like configuration cantilever mounted in vertically spaced relationship on the inner wall of said refrigerant chamber member and extending inwardly therefrom in interleaved relationship with said collar fins to provide radiative heat exchange therebetween.

13. In an electron microscope having an evacuable housing along the axis of which an electron beam passes, a specimen stage which is adapted to receive a cylindrical specimen holder, said stage comprising
(a) a tubular, cylindrical collar mounted in said housing coaxially with said beam axis, said cylindrical specimen holder being disposable within said collar,
(b) a plurality of disc-like, heat exchanger, cantilever fins mounted on the outer periphery of said collar spaced from each other in stacked relationship, said fins extending outwardly from said collar,
(c) a cylindrical member having an annular chamber therein for a liquid refrigerant, said cylindrical member being mounted in said housing around said collar and coaxially with said axis, and
(d) a plurality of disc-like cantilever fins mounted on the inner periphery of said cylindrical member spaced from each other in stacked relationship, said last-named fins extending outwardly from said inner periphery into interleaved relationship with said collar fins to provide for radiative heat exchange between said specimen and said refrigerant.

14. In an electron microscope having an evacuable housing along the axis of which an electron beam passes, a specimen stage for said microscope, said stage comprising
(a) a plate mounted within said housing and having an opening therein through which said beam passes,
(b) a tubular, cylindrical collar mounted in insulating relationship on said plate coaxially with said beam axis and adapted to receive a cylindrical specimen holder therein,
(c) a plurality disc-like, heat exchanger, cantilever fins mounted on the outer periphery of said collar and spaced from each other in stacked relationship,
(d) a cylindrical member having an annular chamber therein for retaining a liquid refrigerant, said cylindrical member being mounted in insulating relationship with said casing around said collar and coaxial to said electron beam axis,
(e) a plurality of disc-like cantilever fins mounted on the inner periphery of said cylindrical member spaced from each other in stacked relationship and extending inwardly from said inner periphery into interleaved relationship with said collar fins to provide for radiative heat exchange between said specimen and said refrigerant,
(f) a disc-shaped, non-inductive, electric heater element having a center opening therethrough, and
(g) means for mounting said element spaced from said collar in conductive heat exchange relationship with said cylindrical member and coaxially with said beam axis.

15. In an electron microscope having an evacuable housing along the axis of which an electron beam passes, a specimen stage for said microscope, said stage comprising
(a) a plate mounted within said housing and having an opening therein through which said beam passes,
(b) a tubular cylindrical collar disposed coaxially with said beam axis and adapted to receive a cylindrical specimen holder therein,
(c) a plurality of disc-like, cantilever fins mounted on the outer periphery of said collar and spaced from each other in stacked relationship, said fins extending radially outwardly from said collar,
(d) a cylindrical member having an annular chamber therein for retaining a liquid refrigerant, said cylindrical member being disposed around said collar coaxially with said electron beam axis,
(e) a plurality of disc-like, cantilever fins mounted on and extending radially inwardly from the inner periphery of said cylindrical member, said last-named fins being spaced from each other in stacked relationship and interleaved with said collar fins to provide for radiative heat exchange between said specimen and said refrigerant,
(f) a casing containing said fins, (g) a thermal insulation member supporting said cylindrical refrigerant member, and
(h) another thermal insulation member supporting said collar on said plate in spaced relation to said cylindrical refrigerant member so that said collar fins float free of said cylindrical member fins when said collar and said cylindrical member are mounted on their respective insulation members.

References Cited by the Examiner
UNITED STATES PATENTS

| | | | |
|---|---|---|---|
| 2,220,973 | 11/40 | Marton | 250—49.5 |
| 2,406,551 | 8/46 | Lucke | 165—177 X |
| 2,543,825 | 3/51 | Beu et al. | 250—51.5 |
| 2,858,444 | 10/58 | Leisegang | 250—49.5 |

RALPH G. NILSON, *Primary Examiner.*